United States Patent Office 3,446,797
Patented May 27, 1969

3,446,797
N-(2-PROPYNYL) NITROGEN-CONTAINING HETEROCYCLIC COMPOUNDS
Antonino Focella, Clifton, and Albert Israel Rachlin, Verona, N.J., assignors to Hoffmann-La Roche Inc., Nutley, N.J., a corporation of New Jersey
No Drawing. Filed Mar. 28, 1966, Ser. No. 537,655
Int. Cl. C07d 41/06, 29/20, 27/24
U.S. Cl. 260—239.3           10 Claims

ABSTRACT OF THE DISCLOSURE

N-(2-propynyl)-pyrrolidones and analogs are prepared by condensing a pyrrolidone or an analog thereof with an appropriate halo propyne. The end products possess plant fungicidal properties.

---

This application relates to a novel class of nitrogen-containing heterocyclic compounds. More particularly, the application relates to novel compounds of the formula

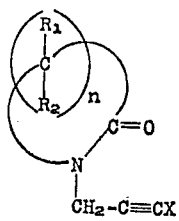

(I)

wherein each $R_1$ and $R_2$ is independently selected from the group consisting of hydrogen and lower alkyl, $n$ is an integer from 3 to 5, and X is halogen, and to certain novel intermediates in the preparation thereof.

The term "lower alkyl" represents straight or branched chain saturated hydrocarbons of 1 to 6 carbon atoms such as methyl, ethyl, propyl, isopropyl, butyl and the like. The term "halogen" represents all four halogens, i.e., bromine, chlorine, iodine and fluorine with bromine, chlorine and iodine being preferred. Particularly preferred is iodine.

The heterocyclic compounds of Formula I are prepared by condensing a nitrogen-containing heterocycle of the formula

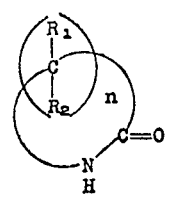

(II)

wherein $R_1$, $R_2$ and $n$ have the same significance as above with a propargyl halide to form an acetylenic compound of the type represented by Formula I having a hydrogen atom in place of the terminal halogen represented by the symbol X, and, if desired, halogenating with the appropriate halogenating agent to form a compound of Formula I wherein X is halogen. The acetylenic intermediates wherein at least one of $R_1$ and $R_2$ is lower alkyl or $n$ is 4 or 5 are also novel compounds and thus constitute part of this invention. Alternatively, the halogenated end products of Formula I can be obtained directly by condensing a compound of Formula II with a 1,3-dihalopropyne. The condensation is suitably carried out in the presence of an inert organic solvent at an elevated temperature preferably at a temperature between about room temperature and the reflux temperature of the reaction mixture. Halogenation can be effected by any of the usual techniques for halogenating acetylene compounds.

The novel compounds of Formula I are useful as antifungal agents. They are particularly useful in combating phytopathogenic fungi. Among the phytopathogenic fungi against which the novel compounds of this invention have been found to be especially effective, there can be named the following: Botrytis cinerea, Venturia inaequails, Phytophthora infestans and Erysiphe cichorearum. Thus, these compounds can be effectively used for the control of plant diseases such as grape and bean botrytis, apple scab and mildew. For use as plant fungicides, the novel products of this invention can be prepared in an emulsified dispersed or dissolved form or in a dusting preparation. They can be combined with inert carriers, solvents, diluents, emulsifiers, dispersing agents, wetting agents or with other active substances such as other fnugicides, bactericides, nematocides, herbicides, fertilizers and the like. They can be used as solutions suitable for spraying prepared by dissolving in organic solvents such as mineral oil fractions, coal tar oils, oils of vegetable or animal origin, hydrocarbons such as naphthalenes, ketones, or chlorinated hydrocarbons such as tetrachloroethane, tetrachloroethylene, tetrachlorobenzene and the like. They can be prepared in forms suitable for dilution with water to form aqueous liquors such as, for example, emulsion concentrates, pastes or wettable powders. They can be combined with solid carriers for making dusting or strewing powders as, for example, talc, kaolin, bentonite, calcium carbonate, calcium phosphate, etc.

This invention will be more fully understood from the specific examples which follow. These examples are illustrative of the invention and are not to be construed as limitative thereof. All temperatures are stated in degrees centigrade.

EXAMPLE 1

Into a 2 liter, three neck flask, equipped with a stirrer, a pressure equalizing dropping funnel, a thermometer and a reflux condenser fitted with a $CaCl_2$ drying tube were charged 85 g. (1 mole) of 2-pyrrolidone, 144 g. (1.2 moles) of propargyl bromide and 750 cc. of dry ethyl acetate. The resulting solution was stirred and heated to incipient boiling. A solution of 59.4 g. (1.1 mole) of sodium methoxide in 350 cc. of methanol was added dropwise within a period of 5 hours. The reaction mixture was refluxed and stirred for an additional 4 hours and then it was cooled slowly to room temperature. The white precipitate of inorganic salt was filtered through a Hyflo pad, the cake was washed with 150 cc. of dichloromethane and the solvent was distilled under reduced pressure. The oily residue was partitioned between 500 cc. of dichloromethane and 250 cc. of water. The organic phase was separated, dried over anhydrous sodium sulfate and distilled under reduced pressure. The product, 1-(2-propynyl)-2-pyrrolidinone, distilled at 70–72° C./ 0.02 mm. $n_D^{23}=1.4942$.

To a 1 liter, three neck flask equipped with a stirrer, a dropping funnel and a thermometer were charged 61.5 g. (0.5 mole) of 1-(2-propynyl)-2-pyrrolidinone and 200 cc. of methanol. To the vigorously stirred solution were added simultaneously 162 g. (0.63 mole) of iodine and 496 cc. of a 10 percent sodium hydroxide solution. The temperature of the reaction mixture rose to 40–45°. It was allowed to cool to room temperature with stirring.

Water (300 cc.) was added and the reaction mixture was extracted with 3× 300 cc. of dichloromethane. The organic layer was dried over anhydrous sodium sulfate and the solvent was distilled under reduced pressure. The oily residue, dissolved in 500 cc. of hot ligroin (60–90°) was crystallized to yield 1-(3-iodo-2-propynl)-2-pyrrolidinone, M.P. 130–134°. The analytical sample, recrystallized from a mixture of ligroin (60–90°) and benzene (1:1), melted at 135–137°.

EXAMPLE 2

Into a 500 cc., three neck flask, equipped with a stirrer, a pressure equalizing dropping funnel, a thermometer and a reflux condenser fitted with a CaCl₂ drying tube were charged 25 g. (0.25 mole) of 5-methyl-2-pyrrolidinone, 36 g. (0.3 mole) of propargyl bromide and 200 cc. of dry ethyl acetate. The resulting solution was stirred and heated to incipient boiling. A solution of 15 g. (0.27 mole) of sodium methoxide in 90 cc. of methanol was added dropwise within a period of 5 hours. The reaction mixture was refluxed and stirred for an additional 24 hours, it was allowed to cool slowly to room temperature and the white precipitate of inorganic salt was filtered through a Hyflo pad. The cake was washed with 150 cc. of dichloromethane and the combined organic solution was washed with 200 cc. of water. The organic phase was separated, dried over anhydrous sodium sulfate and the solvent was distilled under reduced pressure. The oily residue was distilled in vacuo and was collected as 1-(2-propynyl)-5-methyl-2-pyrrolidinone, the fraction boiling at 54°/0.08 mm. $n_D^{24}$=1.4887.

To a 500 cc., three neck flask, equipped with a stirrer, a dropping funnel and a thermometer were charged 18 g. (0.13 mole) of 1-(2-propynyl)-5-methyl-2-pyrrolidinone and 100 cc. of methanol. To the vigorously stirred solution were added simultaneously 46.4 g. (0.18 mole) of iodine and 112 cc. of a 10 percent sodium hydroxide solution. The temperature of the reaction mixture rose to 35–40°. It was allowed to cool to room temperature with stirring, water (100 cc.) was added and the reaction mixture was extracted with 3× 150 cc. of dichloromethane. The organic layer was dried over anhydrous sodium sulfate and the solvent was distilled under reduced pressure. The oily residue dissolved in 500 cc. of hot ligroin (60–90°) crystallized to yield 1-(3-iodo-2-propynyl)-5-methyl-2-pyrrolidinone of melting point 78–80°.

EXAMPLE 3

Into a 1 liter, three neck flask, equipped with a stirrer, a pressure equalizing dropping funnel, a thermometer and a reflux condenser fitted with a CaCl₂ drying tube were charged 49.5 g. (0.5 mole) of 2-oxopentamethyleneimine, 72 g. (0.6 mole) of propargyl bromide and 400 cc. of dry ethyl acetate. The resulting solution was stirred and heated to incipient boiling. A solution of 29.7 g. (0.55 mole) of sodium methoxide in 170 cc. of methanol was added dropwise within a period of 5 hours. The reaction mixture was refluxed and stirred for an additional 24 hours, it was allowed to cool slowly to room temperature and the white precipitate of inorganic salt was filtered through a Hyflo pad. The cake was washed with 150 cc. of dichloromethane and the combined organic solution was washed with 250 cc. of water. The organic phase was separated, dried over anhydrous sodium sulfate and the solvent was distilled under reduced pressure. The oily residue was distilled in vacuo and 1-(2-propynyl)-2-oxopentamethyleneimine was collected as the fraction boiling at 135°/11 mm. $n_D^{24}$=1.5022.

To a 125 cc. three neck flask, equipped with a stirrer, a dropping funnel and a thermometer were charged 1.4 g. (0.01 mole) of 1-(2-propynyl)-2-oxopentamethyleneimine and 20 cc. of methanol. To the vigorously stirred solution were added simultaneously 2.8 g. of iodine and 10 cc. of 10 percent sodium hydroxide solution. The temperature of the reaction mixture rose to 35–40°. It was allowed to cool to room temperature with stirring. Water (40 cc.) was added and the reaction mixture was extracted with 3× 50 cc. of ethyl acetate. The organic phase was dried over sodium sulfate and the solvent was distilled under reduced pressure. The oily residue dissolved in 100 cc. of hot ligroin (60–90°) crystallized to yield 1-(3-iodo-2-propynyl)-2-oxopentamethyleneimine, M.P. 120–121°.

EXAMPLE 4

Into a 1 liter, three neck flask, equipped with a stirrer, a pressure equalizing dropping funnel, a thermometer and a reflux condenser fitted with a CaCl₂ drying tube were charged 56.5 g. (0.5 mole) of 2-oxohexamethyleneimine, 72 g. (0.6 mole) of propargyl bromide and 400 cc. of dry ethyl acetate. The resulting solution was stirred and heated to incipient boiling. A solution of 29.7 g. (0.55 mole) of sodium methoxide in 170 cc. of methanol was added dropwise within a period of 5 hours. The reaction mixture was refluxed and stirred for an additional 48 hours, it was allowed to cool slowly to room temperature and the white precipitate of inorganic salt was filtered through a Hyflo pad. The cake was washed with 150 cc. of dichloromethane and the solvent was distilled under reduced pressure. The oily residue was partitioned between 300 cc. of dichloromethane and 250 cc. of water. The organic phase was separated, dried over anhydrous sodium sulfate and the solvent was distilled under reduced pressure. The oily residue was distilled in vacuo and was collected as 1-(2-propynyl)-2-oxohexamethyleneimine, the fraction boiling at 77°/0.03 mm. $n_D^{24}$=1.5000.

To a 125 cc. three neck flask, equipped with a stirrer, a dropping funnel and a thermometer were charged 1.5 g. (0.01 mole) of 1-(2-propynyl)-2-oxohexamethyleneimine and 20 cc. of methanol. To the vigorously stirred solution were added simultaneously 2.8 g. of iodine and 10 cc. of a 10 percent sodium hydroxide solution. The temperature of the reaction mixture rose to 35–40°. It was allowed to cool to room temperature with stirring, water (40 cc.) was added and the reaction mixture was extracted with 3× 50 cc. of ethyl acetate. The organic layer was dried over anhydrous sodium sulfate and the solvent was distilled under reduced pressure. The oily residue dissolved in 100 cc. of hot ligroin (60–90°), crystallized to yield 1-(3-iodo-2-propynyl)-2-oxohexamethyleneimine, M.P. 98–100°.

We claim:
1. A compound of the formula

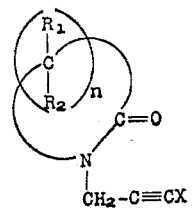

wherein each $R_1$ and $R_2$ is hydrogen or lower alkyl, $n$ is an integer from 3 to 5, and X is halogen.

2. A compound of the formula

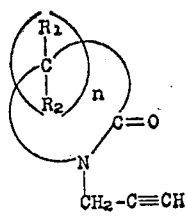

wherein each $R_1$ and $R_2$ is separately hydrogen or lower alkyl and $n$ is 4 to 5.

3. A compound according to claim 1 wherein $n$ is 3.
4. A compound according to claim 1 wherein $n$ is 4.
5. A compound according to claim 1 wherein $n$ is 5.
6. The compound 1-(3 - iodo - 2 - propynyl)-2-pyrrolidinone.
7. The compound 1-(3-iodo - 2 - propynyl-2-oxopentamethyleneimine.
8. The compound 1-(2-propynyl)-2-oxopentamethyleneimine.
9. The compound 1-(3-iodo - 2 - propynyl)-2-oxohexamethyleneimine.
10. The compound 1-(2-propynyl)-2-oxohexamethyleneimine.

References Cited

UNITED STATES PATENTS

| 3,268,397 | 8/1966 | Williams | 260—294.7 |
| 3,278,526 | 3/1962 | Louthan et al. | 260—239.3 |

OTHER REFERENCES

Archibald: "J. Med. Chem.," vol. 8, p. 390 (1965).
Bebbington et al.: "J. Med. Chem.," vol. 8, pp. 274–5 (1965).

HENRY R. JILES, *Primary Examiner.*

R. T. BOND, *Assistant Examiner.*

U.S. Cl. X.R.

260—294.7, 326.5, 999